(12) United States Patent
Yamada

(10) Patent No.: US 9,661,179 B2
(45) Date of Patent: May 23, 2017

(54) IMAGE PROCESSING DEVICE, INFORMATION PROCESSING METHOD, AND NON-TRANSITORY COMPUTER-READABLE MEDIUM

(71) Applicant: FUJI XEROX CO., LTD., Tokyo (JP)

(72) Inventor: Masahiro Yamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/057,448

(22) Filed: Mar. 1, 2016

(65) Prior Publication Data
US 2017/0013163 A1   Jan. 12, 2017

(30) Foreign Application Priority Data

Jul. 7, 2015  (JP) ................................. 2015-135892

(51) Int. Cl.
*H04N 1/04* (2006.01)
*H04N 1/387* (2006.01)
*G06K 9/00* (2006.01)
*H04N 1/00* (2006.01)

(52) U.S. Cl.
CPC ........ *H04N 1/3871* (2013.01); *G06K 9/00469* (2013.01); *H04N 1/00204* (2013.01); *H04N 1/00795* (2013.01); *H04N 2201/0094* (2013.01)

(58) Field of Classification Search
CPC ...... G06F 3/0481; G06F 3/04845; G06F 3/14; G06F 3/1454; G06F 8/61; G06F 8/665; G06F 9/30; G06F 9/30058; G06F 9/38; G06F 9/3806; G06F 9/3861; G06F 9/4443; G06F 9/4446; G06F 9/44505; G06F 9/5094

USPC .............. 358/1.15; 709/203, 224, 204, 223; 382/118

See application file for complete search history.

(56) References Cited

U.S. PATENT DOCUMENTS

| | | | | |
|---|---|---|---|---|
| 5,781,915 A | * | 7/1998 | Kohno | ................ G06F 17/2211 707/999.008 |
| 2005/0149577 A1 | * | 7/2005 | Okada | ................. G06F 11/1458 |
| 2005/0168767 A1 | * | 8/2005 | Moroney | ............. G06K 15/002 358/1.14 |

(Continued)

FOREIGN PATENT DOCUMENTS

JP   2009-267465 A   11/2009

*Primary Examiner* — Negussie Worku
(74) *Attorney, Agent, or Firm* — Oliff PLC

(57) ABSTRACT

In an information processing device, a reading unit reads in a filled-in document. A recognition unit recognizes a standard document type and an information structure of the document. A storage unit stores content filled in on the document. If the read-in document is not a most recent version, a comparing unit compares the information structure of the most recent version of a preregistered standard document type corresponding to the recognized standard document type to the recognized information structure. A generation unit generates a differential document of the modified information structure, according to a result of the comparison. An output unit outputs the generated differential document. If a filled-in differential document is read in, a merge unit merges filled-in content on the differential document with filled-in content on the stored document, and the storage unit replaces the already-stored content with the merged content.

13 Claims, 16 Drawing Sheets

(56) References Cited

U.S. PATENT DOCUMENTS

| | | | |
|---|---|---|---|
| 2009/0240911 A1* | 9/2009 | Yamada | G06F 3/0605 |
| | | | 711/171 |
| 2009/0265605 A1* | 10/2009 | Kaneshiro | G06Q 10/10 |
| | | | 715/221 |
| 2010/0134684 A1* | 6/2010 | Yamada | G09G 5/14 |
| | | | 348/553 |
| 2014/0365782 A1* | 12/2014 | Beatson | G06F 21/32 |
| | | | 713/186 |
| 2015/0317814 A1* | 11/2015 | Johnston | G06F 17/24 |
| | | | 358/1.18 |

* cited by examiner

FIG. 5

| IDENTIFIER | INCOMPLETE FORM DATA STORAGE LOCATION |
|---|---|
| XXXXXXXXXXXXXXXX | Spool/···/A |
| YYYYYYYYYYYYYYYY | Spool/···/B |
| ZZZZZZZZZZZZZZZZ | Spool/···/C |

IMAGE PROCESSING DEVICE, INFORMATION PROCESSING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2015-135892 filed Jul. 7, 2015.

BACKGROUND

Technical Field

The present invention relates to an information processing device, an information processing method, and a non-transitory computer-readable medium.

SUMMARY

According to an aspect of the invention, there is provided an information processing device including: a reading unit that reads in a filled-in document; a recognition unit that recognizes a standard document type and an information structure of the document; a storage unit that stores content filled in on the document; a comparison unit that, if the read-in document is not a most recent version, compares an information structure of the most recent version of a pre-registered standard document type corresponding to the recognized standard document type to the recognized information structure; a generation unit that generates a differential document of the modified information structure, according to a result of the comparison; an output unit that outputs the generated differential document; and a merge unit that, if the differential document filled in by a user is read in, merges filled-in content on the differential document with filled-in content on the document stored in the storage unit, wherein the storage unit replaces already-stored content with the content merged by the merge unit for storage.

BRIEF DESCRIPTION OF THE DRAWINGS

Exemplary embodiments of the present invention will be described in detail based on the following figures, wherein:

FIG. 5 is an explanatory diagram illustrating an example data structure of an identifier table;

DETAILED DESCRIPTION

Hereinafter, various exemplary embodiments related to realizing the present invention will be described by way of example on the basis of the drawings.

<<First Exemplary Embodiment>>

Figure 1:
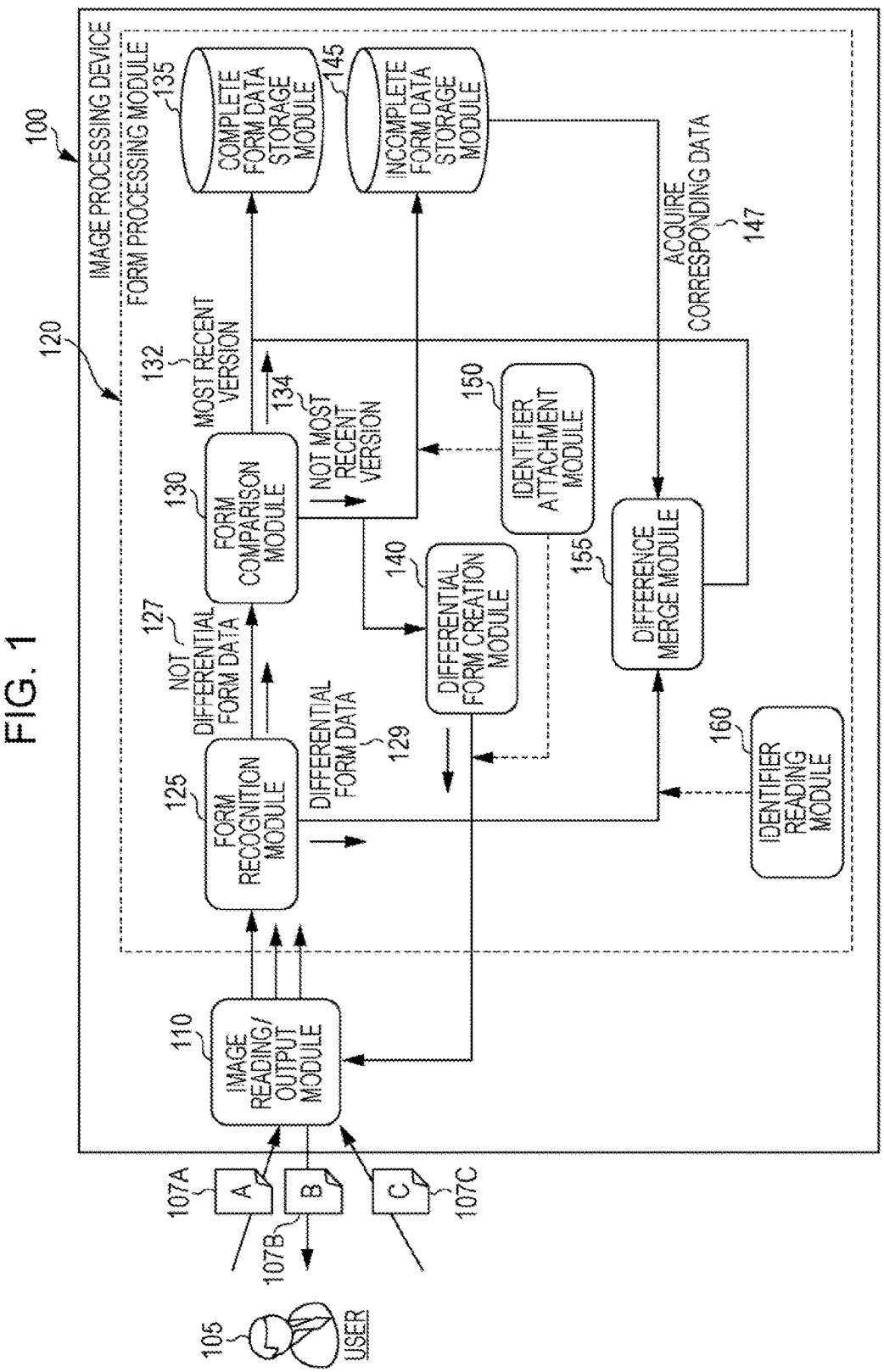
FIG. 1 is a schematic module configuration diagram for an example configuration according to a first exemplary embodiment.

FIG. 1 illustrates a schematic module configuration for an example configuration according to the first exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "device" not only encompass configurations in which multiple computers, hardware, or devices are connected by a communication medium such as a network (including connections that support 1-to-1 communication), but also encompass configurations realized by a single computer, hardware, or device. The terms "device" and "system" are used interchangeably. Obviously, the term "system" does not include merely artificially arranged social constructs (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk, random access memory (RAM), an auxiliary or external storage medium, a storage device accessed via a communication link, and a register or the like inside a central processing unit (CPU).

An information processing device 100 according to the first exemplary embodiment, which is a type of information processing device, relates to data registration using a standard document, and as illustrated by the example of FIG. 1, includes an image reading/output module 110 and a form processing module 120.

In the related art, data input into a system using standard documents has already been deployed widely as a product for applications such as forms solutions. In many of these cases, usage of the most recent version of the standard document type (form) to use is presumed, and if information is registered using an old version of a standard document, the system often returns an error. In addition, the role of the form is to input data into the system.

Such a form, once confirmed, is output in large quantities as printed materials such as paper documents. Also, there is no guarantee against failures to communicate that the form has been updated to a new version, or against users failing to input data using the most recent version of the form due to inattention or carelessness.

If the form is a document such as a contract or a draft proposal submitted for endorsement by particular officials or executives, scanned form documents may also be inserted directly into a workflow. In this case, avoiding the problems described above involves the users acquiring the new form and inputting data again.

The image reading/output module 110 is connected to a form recognition module 125 and a differential form creation module 140 of the form processing module 120. The image reading/output module 110 reads a document 107A and a document 107C, and outputs a document 107B. The document 107A is a form document (the most recent version, or an old version) that has already been filled out by a user 105. The document 107B is a differential document. The document 107C is a filled-out differential document. In other words, the document 107C is the resulting document after the user 105 fills out the document 107B. If the document 107A is not the most recent version (that is, in the case of an old version), the document 107B is output, and the document 107C is read in. If the document 107A is the most recent version, the document 107B is not output, and consequently, the document 107C is not read in.

The image reading/output module 110 reads in the filled-out documents (document 107A and document 107C), and passes document images to the form recognition module 125. Herein, reading in an image refers to, for example, reading an image with a device such as a scanner or camera, receiving an image from external equipment over a communication link via fax or the like, or loading an image stored on a device such as a hard disk (this includes devices built into a computer, as well as devices connected over a network). An image may be a two-level (binary) image or a multi-level image (including a color image). The image to receive may be singular or plural. Also, the content of an image may be any document using a standardized layout (including documents referred to as forms or templates; hereinafter, such documents will also be called forms). For example, the content of an image may be a document used in a business setting, a pamphlet used for advertising, or the like.

In addition, the image reading/output module 110 receives an image generated by the differential form creation module 140, and outputs that image (document 107B). Herein, outputting an image refers to printing the image with a printing device such as a printer, for example.

The form processing module 120 includes a form recognition module 125, a form comparison module 130, a complete form data storage module 135, a differential form creation module 140, an incomplete form data storage module 145, an identifier attachment module 150, a difference merge module 155, and an identifier reading module 160. The form processing module 120 conducts form-related processing.

The form recognition module 125 is connected to the image reading/output module 110, the form comparison module 130, and the difference merge module 155. The form recognition module 125 passes not-differential form data 127 to the form comparison module 130, and passes differential form data 129 to the difference merge module 155. The form recognition module 125 recognizes the standard document type and the information structure of the document from the image read in by the image reading/output module 110. Herein, recognizing the standard document type means recognizing the form. For example, identification information in an information image included in the image is recognized, and the standard document type of the read-in document (the type of form (including a differential form)) is discriminated. Note that an information image refers to an image code that is systematically created to express electronic data in a machine-readable form, and specifically refers to a one-dimensional barcode, a two-dimensional code (specifically, a code such as a Quick Response (QR) code (registered trademark)), or the like. In addition, the standard document type may also be extracted by performing character recognition on a character image (such as characters indicating the form, or an identifier to be discussed later) in the image read in by the image reading/output module 110. For example, it is sufficient to print a character image indicating the standard document type at a predetermined position, and perform character recognition on the printed character image. A digital watermark (visible or invisible) indicating identification information may also be used. In addition, if an IC chip is embedded into the (paper) document, identification information stored in the IC chip may be read in. Additionally, the standard document type may also be extracted from the position, size, and type of item fields in the image (such as the results of performing character recognition on a character image indicating the name of an item field).

Additionally, the form recognition module 125 recognizes the information structure (form) of the standard document type from the image. For example, an item field of information included in the image is recognized by image processing, and the center coordinate of the item field (an X coordinate and a Y coordinate from a predetermined reference position) and the size of the item field (the size in the X-axis and Y-axis directions) are recognized. Herein, the image processing for recognizing an item field may be, for example, extracting line segments of a predetermined length or more, and extracting rectangles enclosed by the line segments.

In addition, if the image read in by the image reading/output module 110 is a form document (document 107A), the form recognition module 125 passes the image (not-differential form data 127, specifically, the document 107A) to the form comparison module 130, whereas if the image read in by the image reading/output module 110 is a document (document 107C) obtained by filling in the document 107B (the document output by the image reading/output module 110), the form recognition module 125 passes the image (differential form data 129, specifically, the document 107C) to the difference merge module 155. Note that the person who fills in the document 107B is taken to be the user 105 as an example, but may also be a user other than the user 105 who performs the operations for reading in the document.

Specifically, if the standard document type is successfully discriminated as discussed above, the document may be determined to be a form document (document 107A). Otherwise, the document may be determined to be a differential document (document 107C). Also, if the document resembles the document output by the image reading/output module 110 (since the document output by the image reading/output module 110 is filled in, the filled-in document resembles the output document), the document may be determined to be a differential document (document 107C). Otherwise, the document may be determined to be a form document (document 107A).

The form comparison module 130 is connected to the form recognition module 125, the complete form data storage module 135, the differential form creation module 140, and the incomplete form data storage module 145. The form comparison module 130 receives not-differential form data 127 from the form recognition module 125, passes a most recent version 132 to the complete form data storage module 135, and passes a not-most recent version 134 to the differential form creation module 140 and the incomplete form data storage module 145. If the document read in by the image reading/output module 110 is not the most recent version, the form comparison module 130 compares the information structure of the most recent version of the standard document type preregistered in association with the recognized standard document type to the recognized information structure.

Specifically, the standard document type of the information structure is used to determine whether or not the document read in by the image reading/output module 110 is the most recent version. For example, it is sufficient to store the most recent version for each standard document type in advance, and determine whether or not the standard document type of the document read in by the image reading/output module 110 corresponds to a stored most recent version. Also, it is sufficient to store the information structure of the most recent version for each standard document type in advance, and determine whether or not the standard document type of the document read in by the image reading/output module 110 corresponds to a stored most recent version.

Additionally, if the document read in by the image reading/output module 110 is the most recent version, the form comparison module 130 causes the complete form data storage module 135 to store the content stated in the document, whereas if the document is not the most recent version, the form comparison module 130 causes the incomplete form data storage module 145 to store the content stated in the document. The "content stated in the document" may be the document image itself, partial images inside item fields obtained by extracting the portions stated in item fields in the document image, or character recognition results obtained by performing character recognition within the item fields. Note that if the document is not the most recent version, the difference merge module 155 merges the content already stored in the incomplete form data storage module 145 (the content stated in the document 107A) with the content stated in the document 107C, and causes the complete form data storage module 135 to store the merged result.

The complete form data storage module 135 is connected to the form comparison module 130 and the difference merge module 155, and receives the most recent version 132 from the form comparison module 130. The complete form data storage module 135 stores the content stated in the document read in by the image reading/output module 110 (the most recent version of the document 107A, or a not-most recent version of the document 107A and the document 107C).

The incomplete form data storage module 145 is connected to the form comparison module 130, the identifier attachment module 150, and the difference merge module 155, and receives the not-most recent version 134 from the form comparison module 130. The incomplete form data storage module 145 stores the content stated in the document read in by the image reading/output module 110 (a not-most recent version of the document 107A).

The differential form creation module 140 is connected to the image reading/output module 110, the form comparison module 130, and the identifier attachment module 150, and receives the not-most recent version 134 from the form comparison module 130. The not-most recent version 134 corresponds to an old version. The differential form creation module 140 generates a differential document made up of a modified information structure as a result of the comparison by the form comparison module 130. Note that the term "modified" herein includes alteration and addition. In other words, if the document read in by the image reading/output module 110 is not the most recent version, the differential form creation module 140 generates a document made up of the difference from the most recent version (the modified portion). For example, the differential document is structured to include item fields that were altered or added between the version of the document read in by the image reading/output module 110 and the most recent version.

In addition, the image reading/output module 110 outputs the differential document (document 107B) generated by the differential form creation module 140. Next, the user 105 fills in the differential document (document 107B), or in other words, creates the document 107C, and the image reading/output module 110 reads in the filled-in differential document (document 107C).

The identifier attachment module 150 is connected to the image reading/output module 110, the differential form creation module 140, and the incomplete form data storage module 145. The identifier attachment module 150 generates an identifier to associate with the content stored in the incomplete form data storage module 145 by the form comparison module 130 and the document generated by the differential form creation module 140, the identifier enabling unique identification of the above in the present exemplary embodiment, and causes the identifier to be stored in association with the content stored in the incomplete form data storage module 145. Additionally, the identifier is stated in the document generated by the differential form creation module 140. Herein, stating the identifier may be conducted by embedding the identifier in the information image discussed earlier, or stating characters expressing the identifier in the document. In addition, if the identifier is embedded in the information image, the identifier reading module 160 is configured to decipher the information image to thereby read the identifier, whereas if characters expressing the identifier are stated in the document, the identifier reading module 160 is configured to read the identifier by performing character recognition on the characters. With this identifier, the difference merge module 155 becomes able to merge the content stated in the document 107C with the content stated in the document 107A (the document 107A that triggered the generation of the document 107B).

The difference merge module 155 is connected to the form recognition module 125, the complete form data storage module 135, the incomplete form data storage module 145, and the identifier reading module 160. The difference merge module 155 receives differential form data 129 from the form recognition module 125, and acquires corresponding data 147 from the incomplete form data storage module 145. When a differential document (document 107C) filled in by the user 105 is read by the form recognition module 125, the difference merge module 155 merges the content stated in the differential document with the content stated in the document stored in the incomplete form data storage module 145. Subsequently, the complete form data storage module 135 is made to store the merged content (in other words, the complete form data storage module 135 replaces and stores the content already stored in the incomplete form data storage module 145). Obviously, the complete form data storage module 135 stores the content merged by the difference merge module 155.

The identifier reading module 160 is connected to the difference merge module 155. The identifier reading module 160 extracts an identifier from an image read in by the image reading/output module 110. Specifically, as discussed earlier, an identifier may be extracted from an information image, or character recognition may be performed on a character image. The difference merge module 155 uses the identifier to merge the content stated on the document read in by the image reading/output module 110 with the content in the incomplete form data storage module 145.

Figure 2:
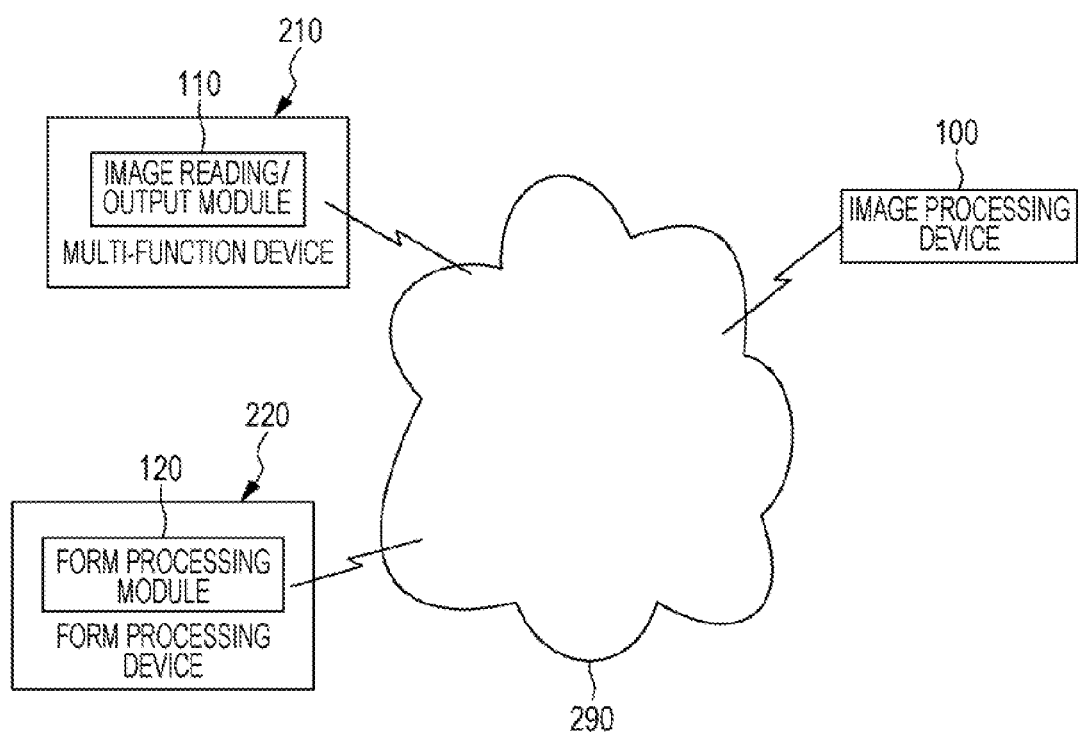
FIG. 2 is an explanatory diagram illustrating an example system configuration utilizing an exemplary embodiment.

FIG. 2 is an explanatory diagram illustrating an exemplary system configuration utilizing an exemplary embodiment.

An information processing device 100, a multi-function device 210, and a form processing device 220 are interconnected by a communication link 290. The communication link 290 may be wireless, wired, or a combination of the two, and may use a network such as the Internet or an intranet as a communication infrastructure, for example.

The multi-function device 210 includes the image reading/output module 110. Herein, a multi-function device refers to an image processing device including two or more functions from among scanning, printing, copying, and faxing functions, for example. The form processing device 220 includes the form processing module 120. For example, the user 105 uses the multi-function device 210 to read in a document 107A, and as a result of processing by the form processing device 220, a document 1073 is printed from the multi-function device 210. The user 105 fills in the document 107B (generates the document 107C) and reads in the document 107C, and as a result of processing by the form processing device 220, the content stated in the document 107A and the document 107C is merged and stored. Note that the form processing device 220 may process a document image from the image reading/output module 110 of the information processing device 100, or conversely, the form processing module 120 of the information processing device 100 may process a document image from the multi-function device 210. In addition, the functions of the form processing device 220 (form processing module 120) may also be realized as a cloud service.

Figure 3A:
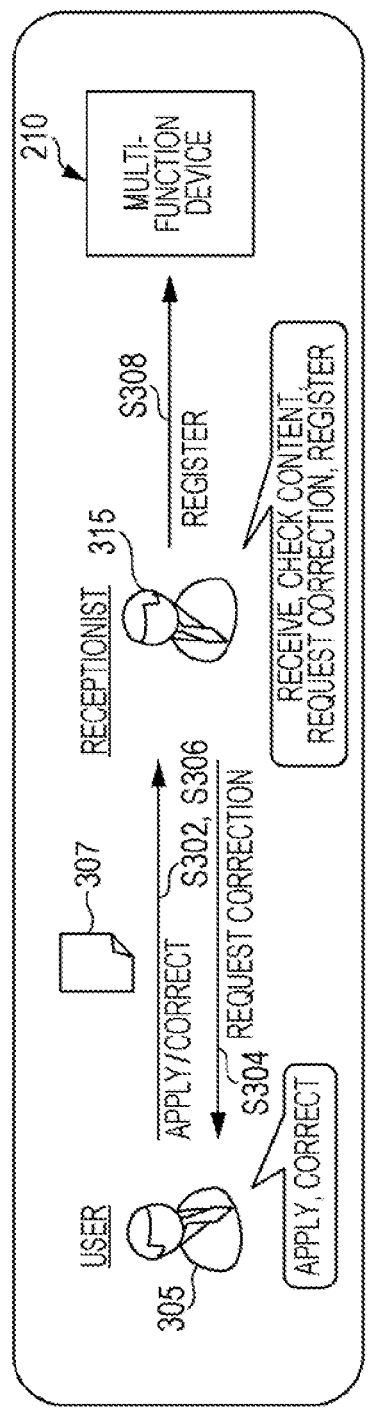
FIGS. 3A and 3B are explanatory diagrams illustrating a comparison between an exemplary embodiment and technology of the related art.
Figure 3B:
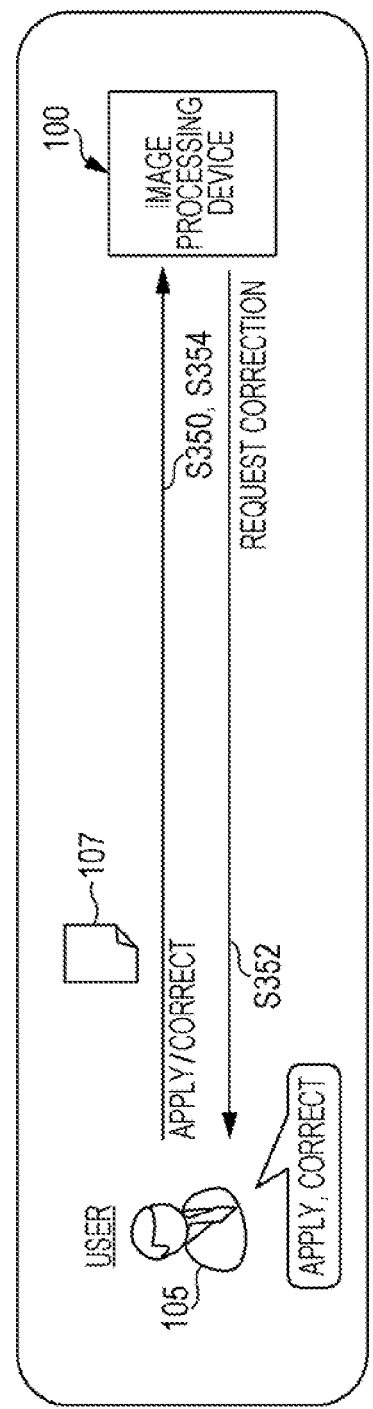

FIGS. 3A and 3B are explanatory diagrams illustrating a comparison between an exemplary embodiment of the present invention and technology of the related art.

The process illustrated as an example in FIG. 3A is a process in the case of not using a configuration according to an exemplary embodiment of the present invention. In this case, the multi-function device 210 does not include the functions of the form processing module 120.

In step S302, a user 305 uses a document 307 to submit an application to a receptionist 315.

In step S304, the receptionist 315 checks whether or not the document 307 uses the most recent version of the form, and if the most recent version is not used, issues a correction request to the user 305.

In step S306, the user 305 corrects the document 307, and submits the application to the receptionist 315 again.

In step S308, the receptionist 315 checks the corrected document 307, and if there are no problems, conducts a registration process on the multi-function device 210.

The process illustrated as an example in FIG. 3B is a process in the case of using a configuration according to an exemplary embodiment of the present invention.

In step S350, the user 105 submits an application on a document 107 to the information processing device 100. Specifically, the user causes the information processing device 100 to conduct a reading process.

In step S352, the information processing device 100 issues a correction request to the user 105. Specifically, if the document 107 is not the most recent version, a differential document is output, and the user is prompted to fill in the differential document.

In step S354, the user 105 corrects the document 107. Specifically, the user 105 fills in the differential document output in step S352, and causes the information processing device 100 to conduct a reading process. After that, the information processing device 100 merges the content stated in the document read in step S350 with the content stated in the differential document read in step S354, and conducts a registration process.

Thus, the content of a document using an old form may still be utilized. Only the item fields missing on the old form are printed, enabling the user 105 to easily grasp the modified content, and perform the registration work. In particular, the above configuration is effective in situations where the form is modified frequently.

Figure 4:
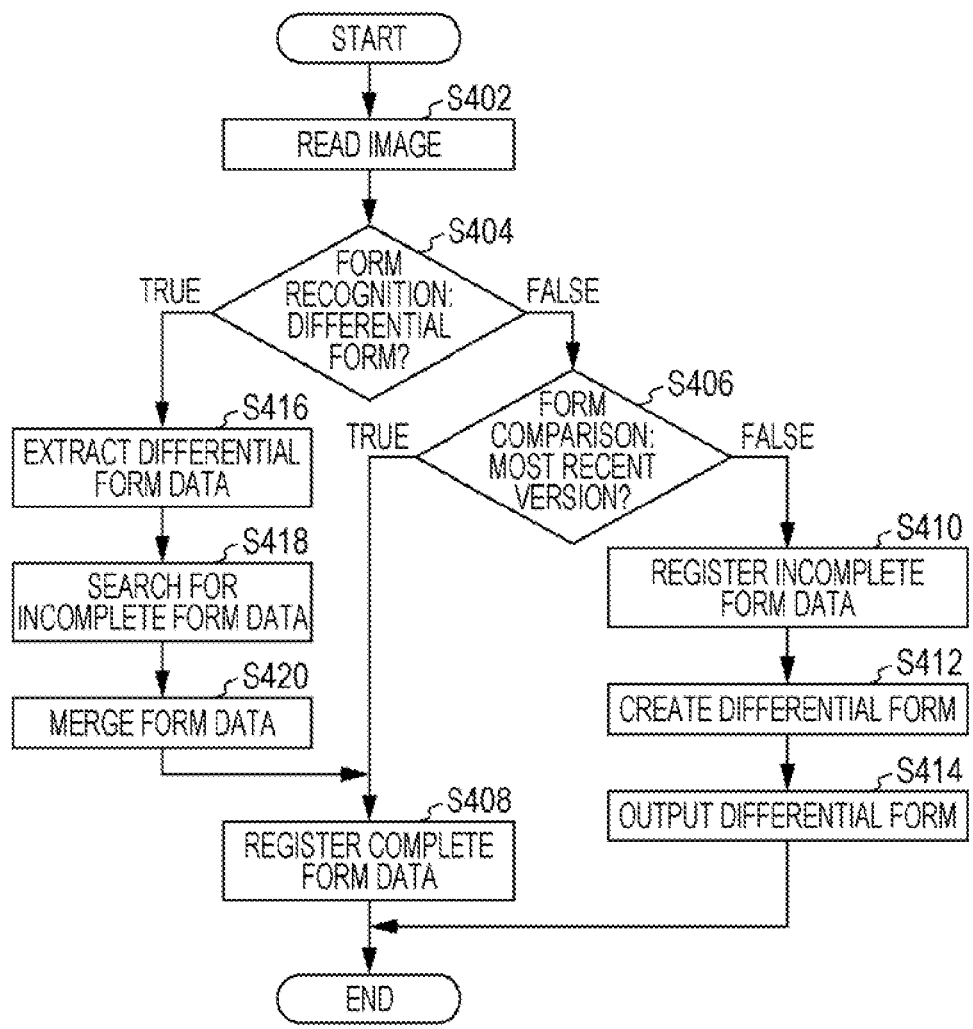
FIG. 4 is a flowchart illustrating an example process according to a first exemplary embodiment.

FIG. 4 is a flowchart illustrating an exemplary process according to the first exemplary embodiment.

In step S402, the image reading/output module 110 reads an image.

In step S404, the form recognition module 125 recognizes the form, and determines whether or not the form is a differential form (differential document, document 107C). If the form is a differential form, the process proceeds to step S416. Otherwise, the process proceeds to step S406.

In step S406, the form comparison module 130 conducts form comparison, and determines whether or not the form is the most recent version. If the form is the most recent version, the process proceeds to step S408. Otherwise, the process proceeds to step S410.

In step S408, if the process advanced from step S406, the form comparison module 130 registers complete form data in the complete form data storage module 135, whereas if the process advanced from step S420, the difference merge module 155 registers the data merged in step S420 as complete form data in the complete form data storage module 135. Herein, complete form data refers to data stated on the most recent version of the form, or data supplemented with items from differential form data (data that is equivalent to data stated on the most recent version of the form).

In step S410, the form comparison module 130 registers incomplete form data (data created with a form having missing items compared to the most recent version of the form, or in other words, the content stated in the document 107A) in the incomplete form data storage module 145. For example, incomplete form data and an identifier are managed with an identifier table 500. FIG. 5 is an explanatory diagram illustrating an example data structure of the identifier table 500. The identifier table 500 includes an identifier field 510 and an incomplete form data storage location field 520. The identifier field 510 stores an identifier. The incomplete form data storage location field 520 stores the storage location of incomplete form data corresponding to the identifier. The identifier fulfills a role of linking (associating) the incomplete form data with a differential form (differential form data: the data stated in a differential form). Herein, it is sufficient for the identifier to be uniquely determined in the exemplary embodiment, and a universally unique identifier (UUID) or the like may be used, for example.

In step S412, the differential form creation module 140 creates a differential form. The differential form is a form stating item fields and the like which are missing on the old version of the form, for example. The identifier discussed above is also attached to the differential form. Consequently, the differential form and the incomplete form data are associated. Item fields that are different between the document read in step S402 (old version) and the most recent version are included as the content of the differential form.

In step S414, the image reading/output module 110 outputs the differential form (document 1073). The user fills in the differential form, and the filled-in form is then subjected to the image reading in step S402.

In step S416, the difference merge module 155 extracts differential form data from the differential form. At this point, the identifier attached to the differential form is also extracted.

In step S418, the difference merge module 155 uses the identifier to search for incomplete form data in the incomplete form data storage module 145.

In step S420, the difference merge module 155 merges form data. In other words, the differential form data and the incomplete form data are merged to generate the data to be stated in the most recent version of the form document.

Figure 6:
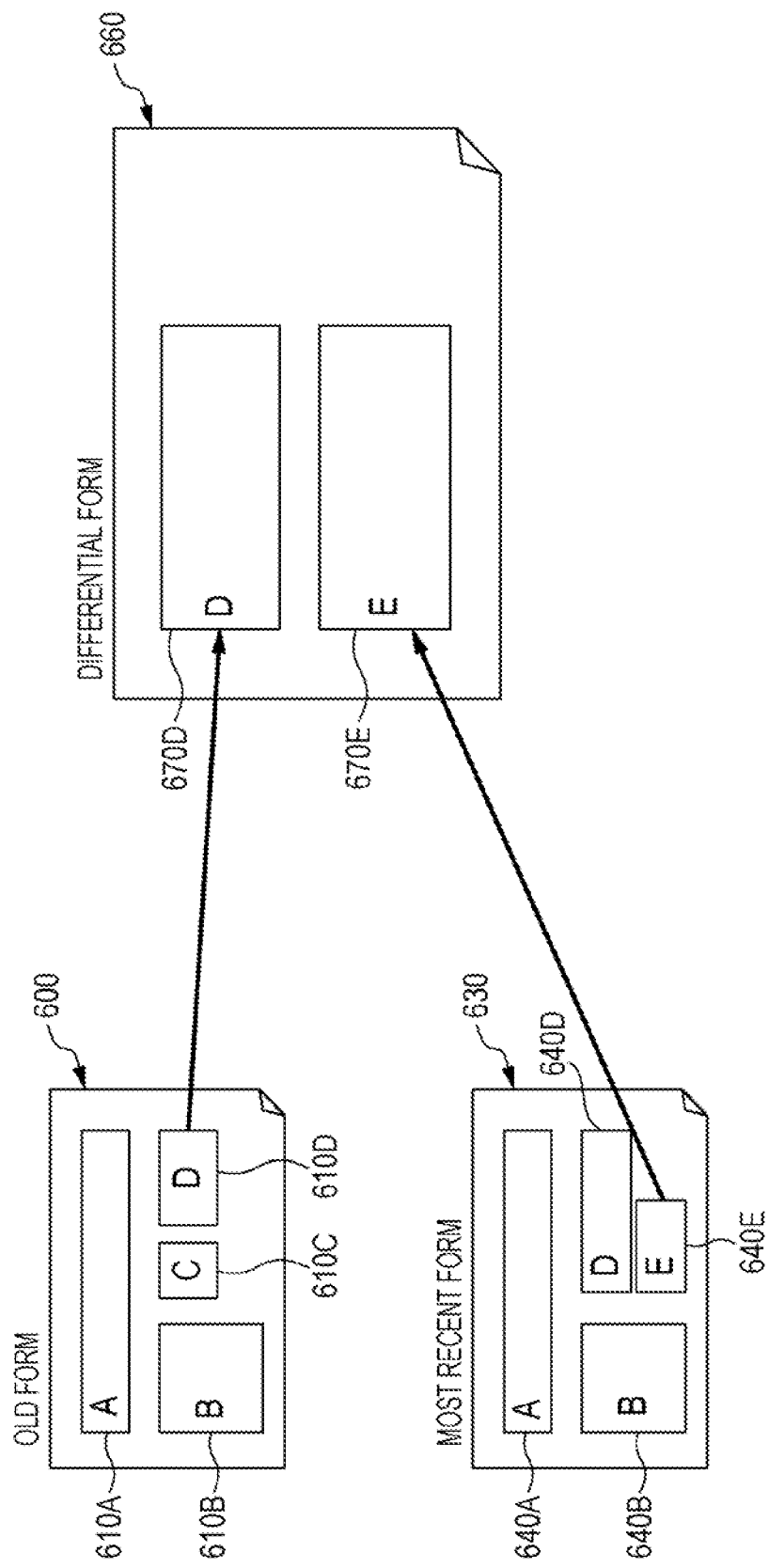
FIG. 6 is an explanatory diagram illustrating an example process according to a first exemplary embodiment.

FIG. 6 is an explanatory diagram illustrating exemplary processing according to the first exemplary embodiment.

The example illustrated in the upper-left of FIG. 6 is a document according to an old form 600, while the example illustrated in the lower-left of FIG. 6 is a document according to the most recent form 630. Ordinarily, the most recent form 630 is to be used, but the following will describe a case in which registration work is performed using the document according to the old form 600.

When the document according to the old form 600 is read in, the information processing device 100 compares the document according to the old form 600 to the most recent form 630.

The items displayed on the differential form 660 are extracted according to the following rules.

Items absent from the old form but present on the new form are stated on the differential form.

Items present on the old form and present with modifications on the new form are stated on the differential form.

Items present on the old form but absent from the new form are not stated on the differential form.

Specifically, the items 610A and 610B are not different from the items 640A and 640B, respectively, and thus are not stated on the differential form 660. Also, the item 610C has been removed, and thus is not stated on the differential form 660. The items 610D and 640D are different from each other, and thus the item 640D is stated on the differential form 660. The item 640E has been added, and thus is stated on the differential form 660. Consequently, a differential form 660 including the items 670D and 670E is generated.

Note that the layout of item fields on the differential form 660 may be determined arbitrarily, since the items will be merged appropriately to match the most recent version of the form by the form data merging process conducted by the difference merge module 155.

<<Second Exemplary Embodiment>>

Figure 7:
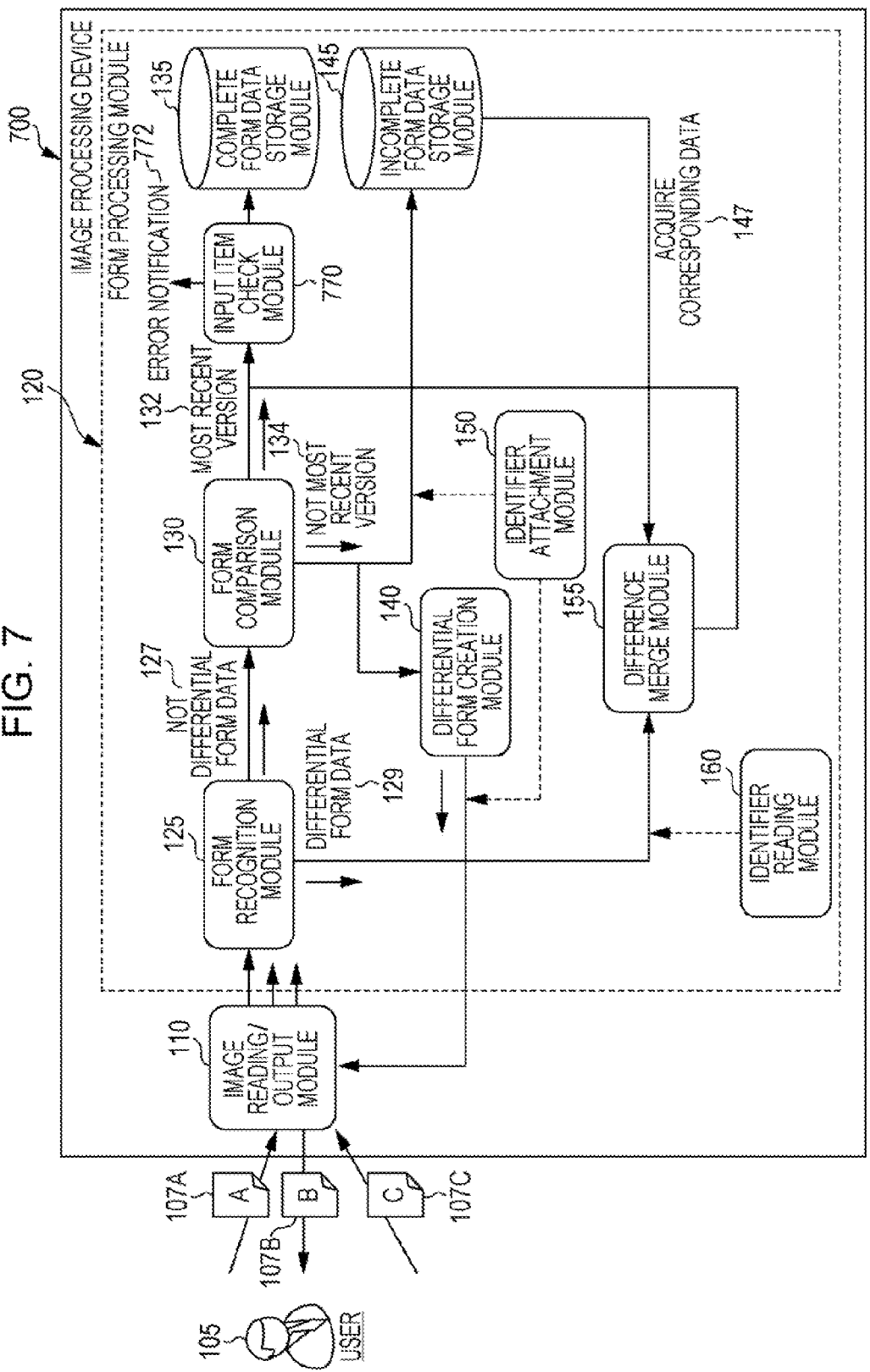
FIG. 7 is a schematic module configuration diagram for an example configuration according to a second exemplary embodiment.

FIG. 7 is a schematic module configuration diagram for an exemplary configuration according to the second exemplary embodiment. The image processing device 700 includes an image reading/output module 110 and a form processing module 120. The form processing module 120 includes a form recognition module 125, a form comparison module 130, a complete form data storage module 135, a differential form creation module 140, an incomplete form data storage module 145, an identifier attachment module 150, a difference merge module 155, an identifier reading module 160, and an input item check module 770. Note that parts similar to the foregoing exemplary embodiment are denoted with the same reference numerals, and repeated explanation of these parts will be reduced or omitted.

The image processing device 700 is obtained by adding the input item check module 770 to the information processing device 100 according to the first exemplary embodiment.

The form comparison module 130 is connected to the form recognition module 125, the input item check module 770, the differential form creation module 140, and the incomplete form data storage module 145. The form comparison module 130 receives not-differential form data 127 from the form recognition module 125, passes a most recent version 132 to the input item check module 770, and passes a not-most recent version 134 to the differential form creation module 140 and the incomplete form data storage module 145.

The complete form data storage module 135 is connected to the input item check module 770.

The difference merge module 155 is connected to the form recognition module 125, the input item check module 770, the incomplete form data storage module 145, and the identifier reading module 160. The difference merge module 155 receives differential form data 129 from the form recognition module 125.

The input item check module 770 is connected to the form comparison module 130, the complete form data storage module 135, and the difference merge module 155. The input item check module 770 receives the most recent version 132 from the form comparison module 130, and issues an error notification 772. The input item check module 770 inspects the content stored in the complete form data storage module 135 (the output from the form comparison module 130 or the difference merge module 155), and if the content is unsuitable, outputs an indication that the content is unsuitable (error notification 772). For example, the input item check module 770 may check whether all items are present. The input item check module 770 confirms not only the validity of the form, but also the validity of filled-in items. In addition, the error notification 772 may be issued by displaying error content on a device such as a liquid crystal display provided for the image processing device 700, or by using a medium such as sound or vibration, for example.

Figure 8:
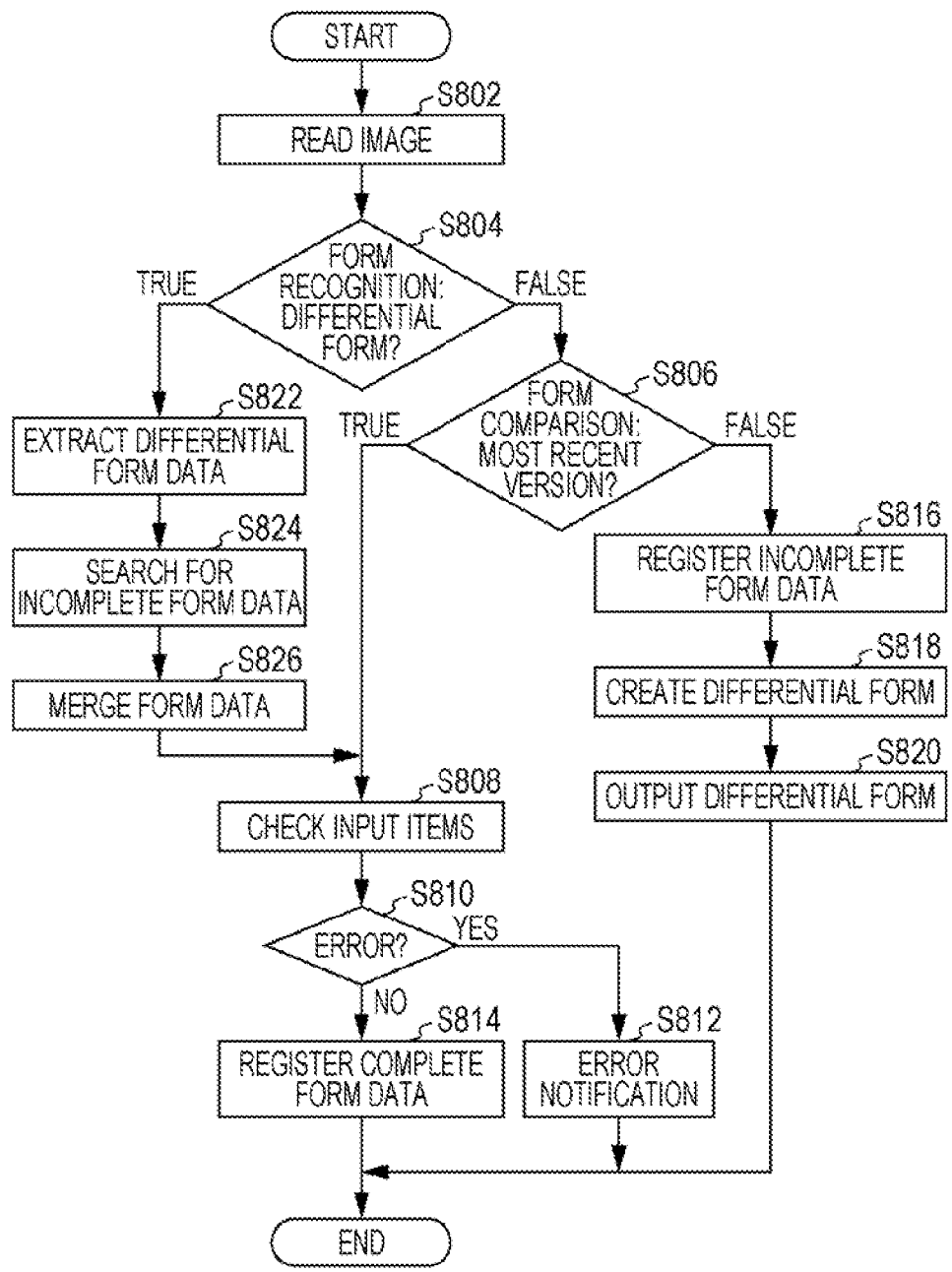
FIG. 8 is a flowchart illustrating an example process according to a second exemplary embodiment.

FIG. 8 is a flowchart illustrating an exemplary process according to the second exemplary embodiment. In FIG. 8, step S408 in the flowchart illustrating an example process according to the first exemplary embodiment illustrated as an example in FIG. 4 has been replaced by steps S808 to S812.

In step S802, the image reading/output module 110 reads an image.

In step S804, the form recognition module 125 recognizes the form, and determines whether or not the form is a differential form. If the form is a differential form, the process proceeds to step S822. Otherwise, the process proceeds to step S806.

In step S806, the form comparison module 130 conducts form comparison, and determines whether or not the form is the most recent version. If the form is the most recent version, the process proceeds to step S808. Otherwise, the process proceeds to step S816.

In step S808, the input item check module 770 checks the input items.

In step S810, it is determined whether or not an error exists, and if so, the process proceeds to step S812, otherwise the process proceeds to step S814.

In step S812, the input item check module 770 issues an error notification.

In step S814, if the process advanced from step S806, the form comparison module 130 registers complete form data in the complete form data storage module 135, whereas if the process advanced from step S826, the difference merge module 155 registers complete form data in the complete form data storage module 135.

In step S816, the form comparison module 130 registers incomplete form data.

In step S818, the differential form creation module 140 creates a differential form.

In step S820, the image reading/output module 110 outputs the differential form.

In step S822, the difference merge module 155 extracts differential form data.

In step S824, the difference merge module 155 searches for incomplete form data.

In step S826, the difference merge module 155 merges form data.

<<Third Exemplary Embodiment>>

Figure 9:
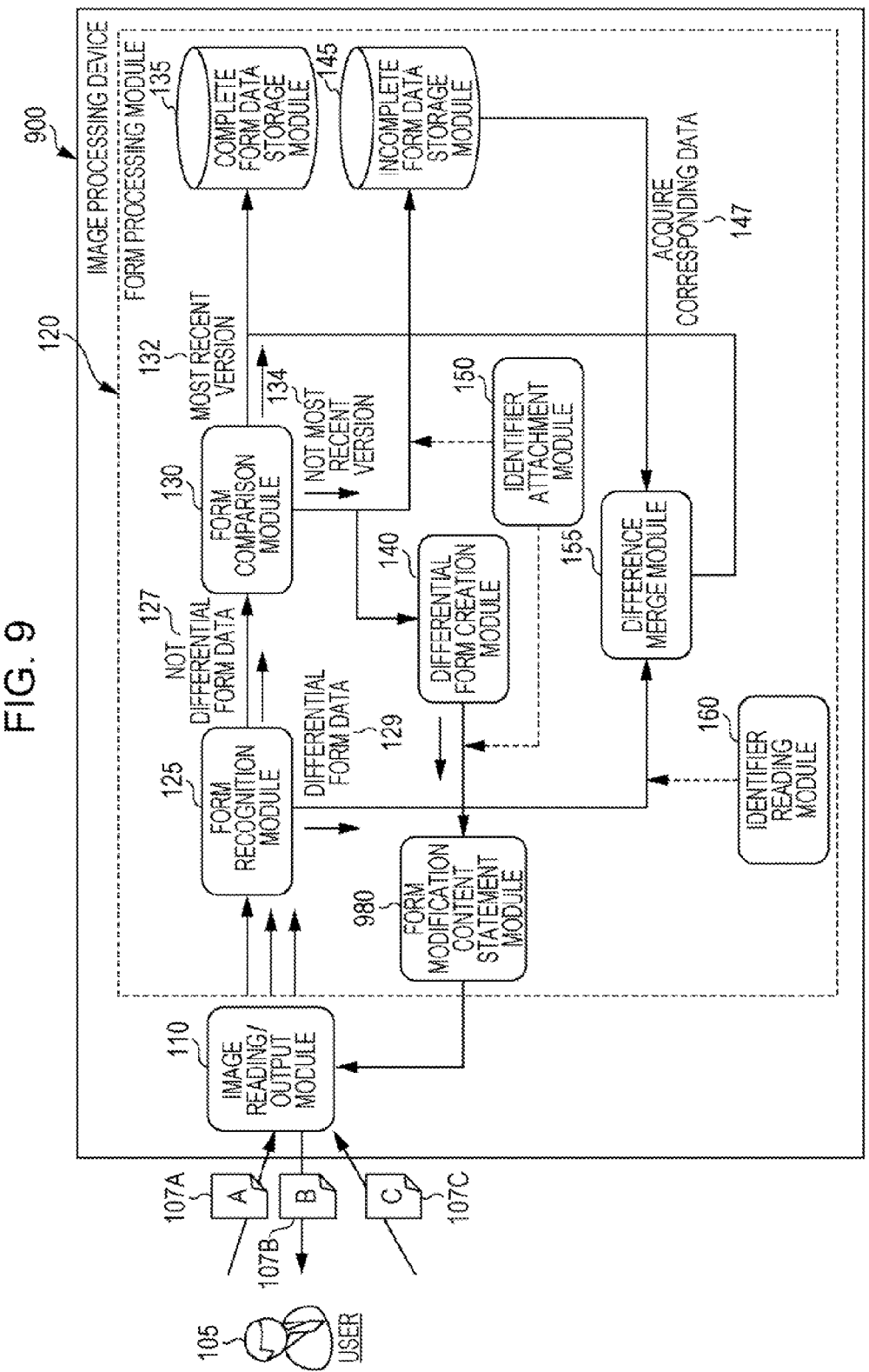
FIG. 9 is a schematic module configuration diagram for an example configuration according to a third exemplary embodiment.

FIG. 9 is a schematic module configuration diagram for an exemplary configuration according to the third exemplary embodiment. The image processing device 900 includes an image reading/output module 110 and a form processing module 120. The form processing module 120 includes a form recognition module 125, a form comparison module 130, a complete form data storage module 135, a differential form creation module 140, an incomplete form data storage module 145, an identifier attachment module 150, a difference merge module 155, an identifier reading module 160, and a form modification content statement module 980.

The image processing device 900 is obtained by adding the form modification content statement module 980 to the information processing device 100 according to the first exemplary embodiment.

The image reading/output module 110 is connected to the form recognition module 125 and the form modification content statement module 980 of the form processing module 120. The image reading/output module 110 reads a document 107A and a document 107C, and outputs a document 107B.

The differential form creation module 140 is connected to the form comparison module 130, the identifier attachment module 150, and the form modification content statement module 980, and receives the not-most recent version 134 from the form comparison module 130.

The identifier attachment module 150 is connected to the differential form creation module 140, the incomplete form data storage module 145, and the form modification content statement module 980.

The form modification content statement module 980 is connected to the image reading/output module 110 and the differential form creation module 140. The form modification content statement module 980, on the basis of a result from the form comparison module 130, adds an explanatory note to the differential document generated by the differential form creation module 140, and causes the image reading/output module 110 to output the result. Subsequently, the image reading/output module 110 outputs the document (document 107B) obtained by adding the explanatory note to the differential document. Herein, the explanatory note explains the differences between the most recent version and the document 107A. For example, the explanatory note indicates which item fields have been added, which item fields have been modified, and the like. Note that the explanatory note may also indicate item fields which have been removed.

Figure 10:
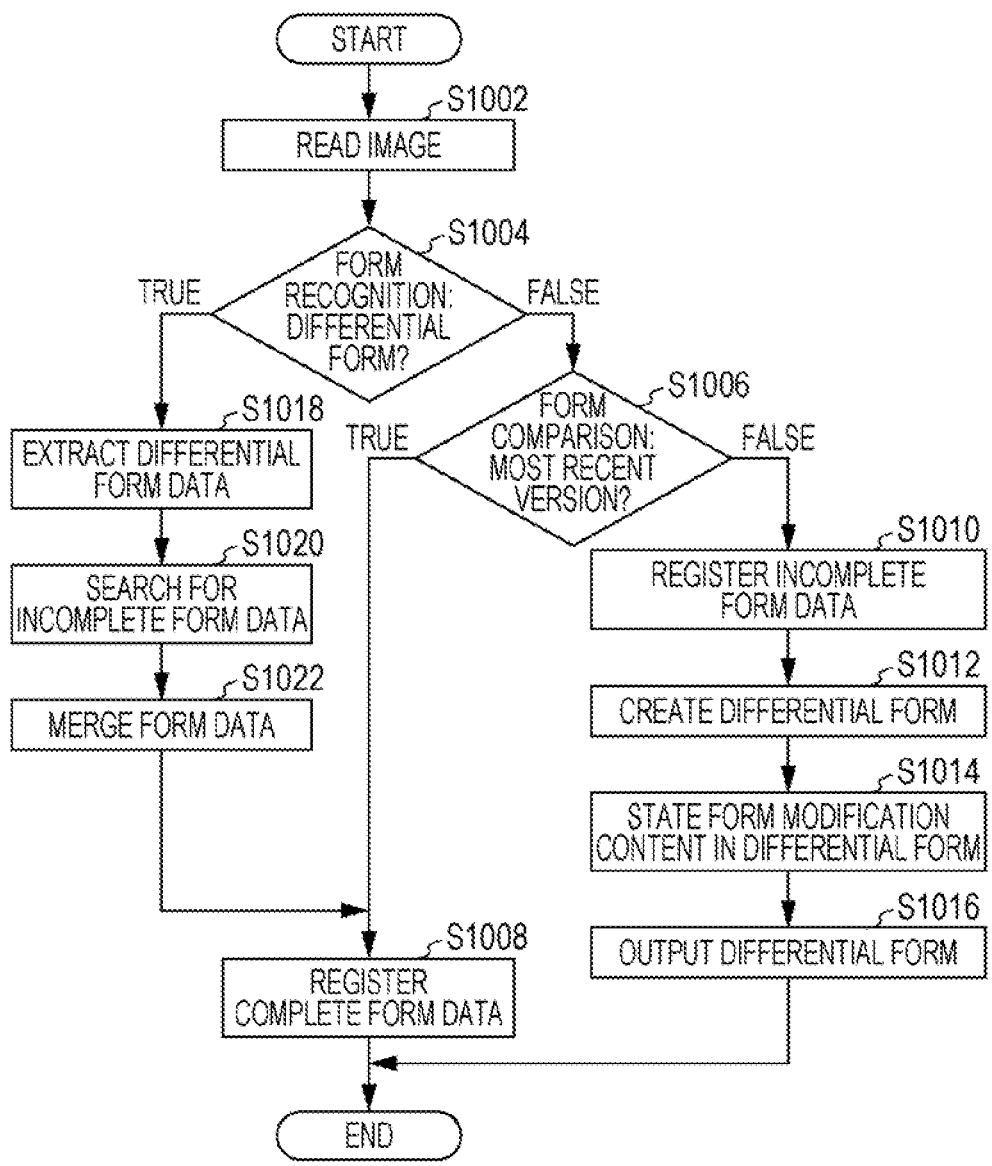
FIG. 10 is a flowchart illustrating an example process according to a third exemplary embodiment.

FIG. 10 is a flowchart illustrating an exemplary process according to the third exemplary embodiment. In FIG. 10, step S1014 has been added to the flowchart indicating an example process according to the first exemplary embodiment illustrated as an example in FIG. 4.

In step S1002, the image reading/output module 110 reads an image.

In step S1004, the form recognition module 125 recognizes the form, and determines whether or not the form is a differential form. If the form is a differential form, the process proceeds to step S1018. Otherwise, the process proceeds to step S1006.

In step S1006, the form comparison module 130 conducts form comparison, and determines whether or not the form is the most recent version. If the form is the most recent version, the process proceeds to step S1008. Otherwise, the process proceeds to step S1010.

In step S1008, if the process advanced from step S1006, the form comparison module 130 registers complete form data in the complete form data storage module 135, whereas if the process advanced from step S1022, the difference merge module 155 registers complete form data in the complete form data storage module 135.

In step S1010, the form comparison module 130 registers incomplete form data.

In step S1012, the differential form creation module 140 creates a differential form.

In step S1014, the form modification content statement module 980 states the form modification content in the differential form.

In step S1016, the image reading/output module 110 outputs the differential form.

In step S1018, the difference merge module 155 extracts differential form data.

In step S1020, the difference merge module 155 searches for incomplete form data.

In step S1022, the difference merge module 155 merges form data.

Figure 11:
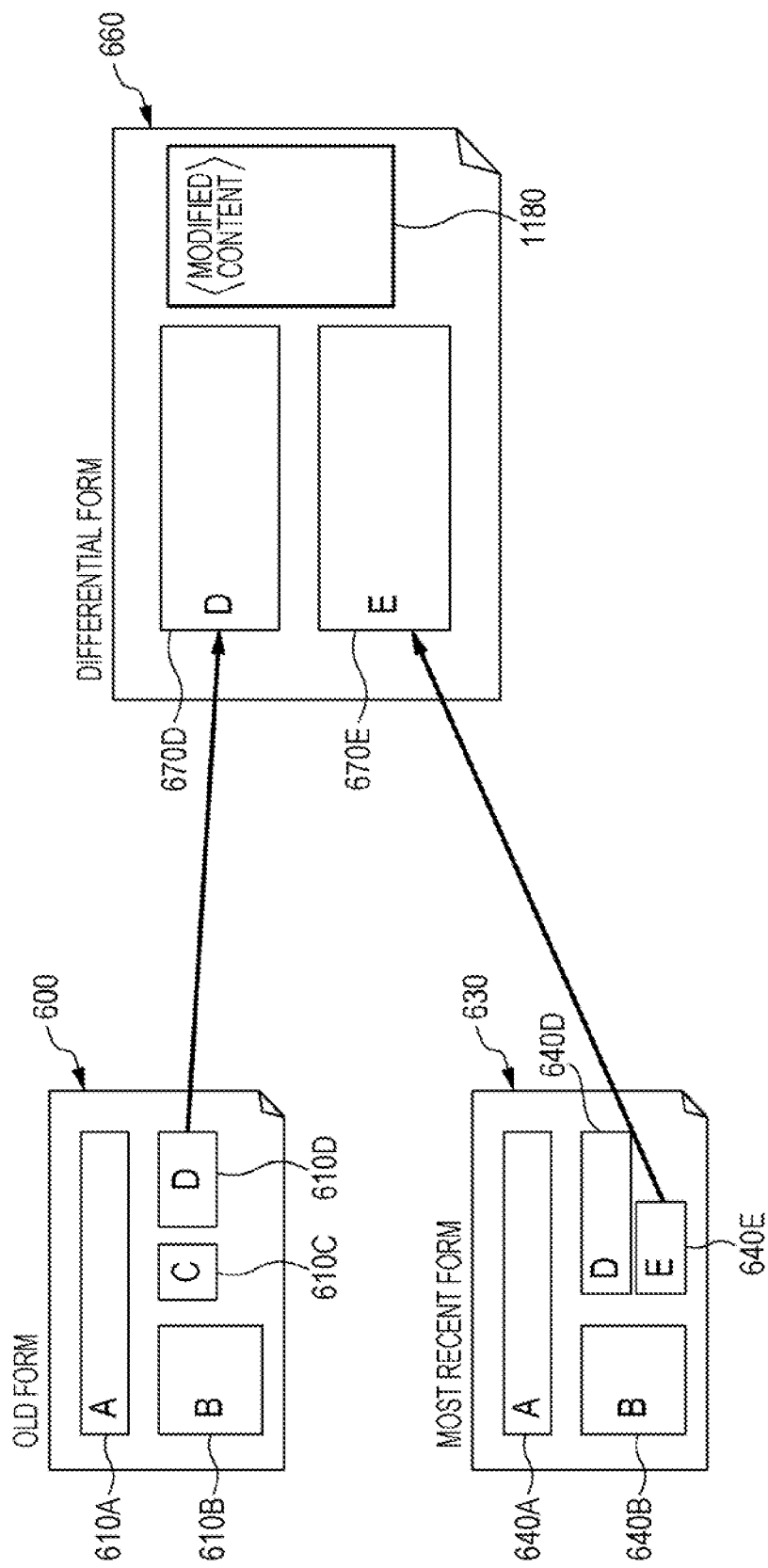
FIG. 11 is an explanatory diagram illustrating an example process according to a third exemplary embodiment.
Figure 12:
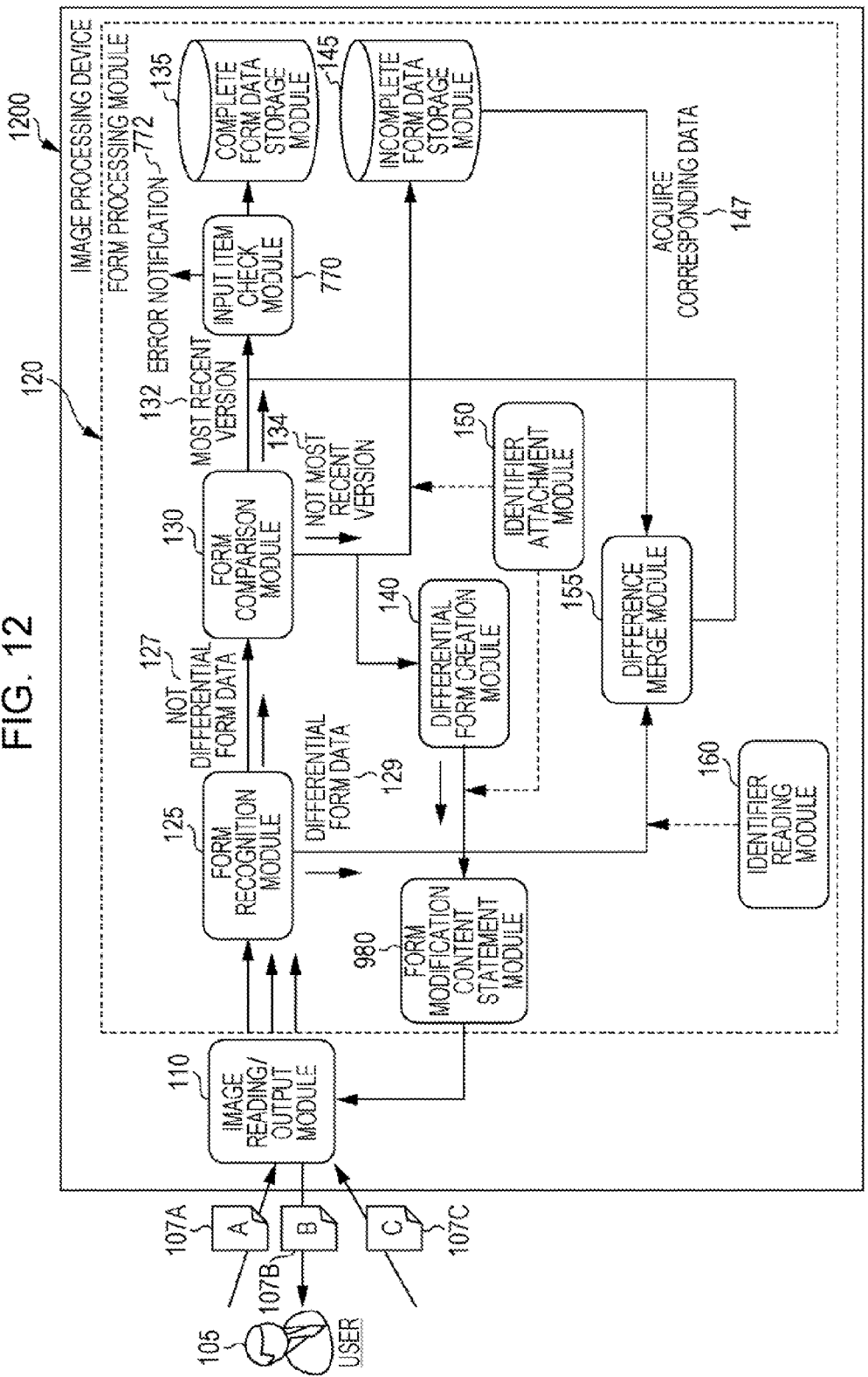
FIG. 12 is a schematic module configuration diagram for an example configuration according to a fourth exemplary embodiment.

FIG. 11 is an explanatory diagram illustrating an example process according to the third exemplary embodiment. FIG. 11 is similar to the example illustration of FIG. 6. However, a modified content description field 1180 is added to the differential, form 660. The form modification content statement module 980 describes the modified content of the form in a modified content description field 1180 so that the user 105 is able to recognize how the form has changed. An explanation of how the form was modified from the old version to the new version is stated on the differential form 660 to enable the user to grasp which items were added, modified, removed, and the like on the most recent version of the form.

<<Fourth Exemplary Embodiment>>

Figure 14:
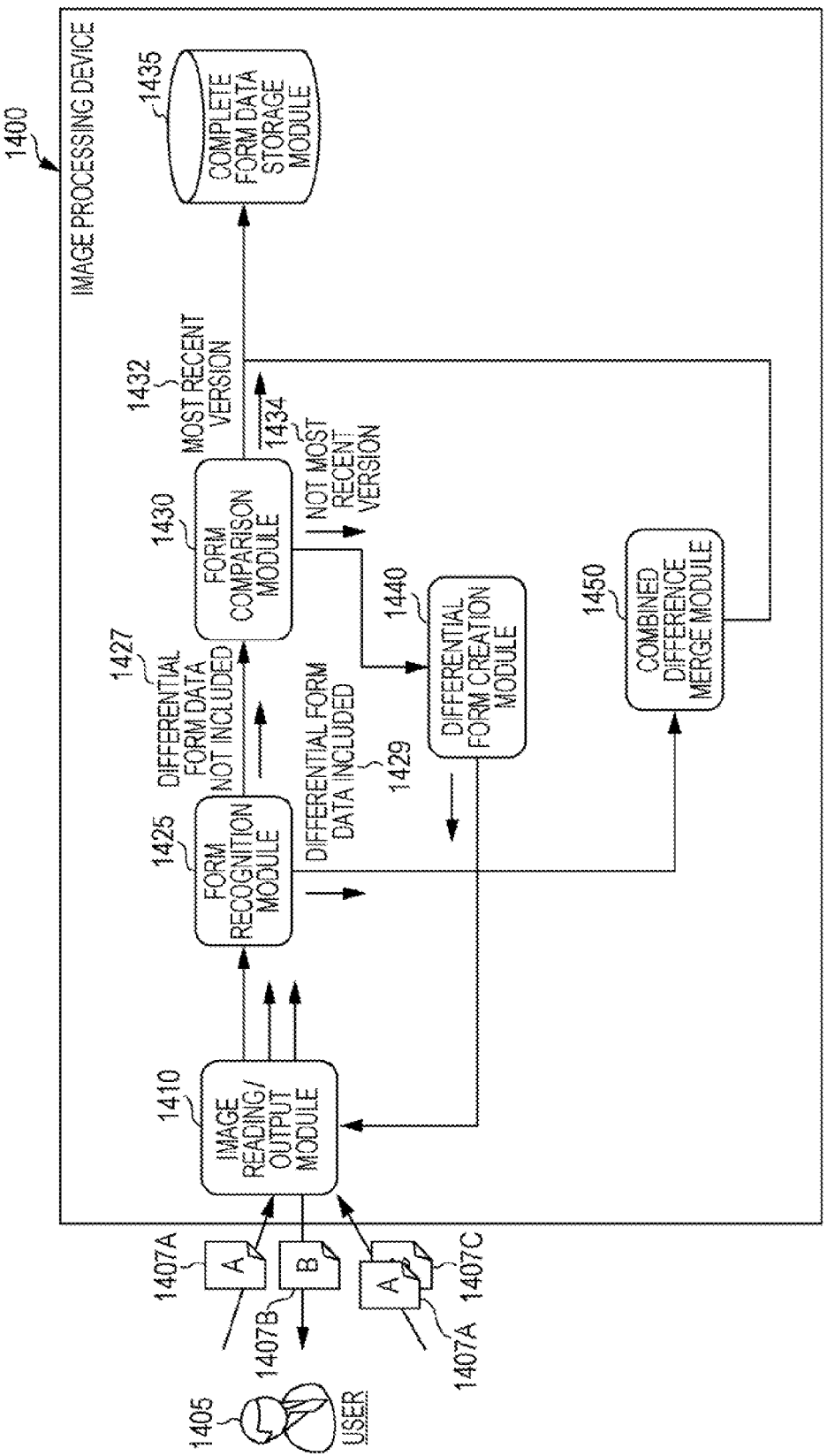
FIG. 14 is a schematic module configuration diagram for an example configuration according to a fifth exemplary embodiment.

FIG. 14 is a schematic module configuration diagram for an exemplary configuration according to the fourth exemplary embodiment.

The image processing device 1200 includes an image reading/output module 110 and a form processing module 120. The form processing module 120 includes a form recognition module 125, a form comparison module 130, a complete form data storage module 135, a differential form creation module 140, an incomplete form data storage module 145, an identifier attachment module 150, a difference merge module 155, an identifier reading module 160, an input item check module 770, and a form modification content statement module 980.

The information processing device 1200 is obtained by adding the input item check module 770 and the form modification content statement module 980 to the information processing device 100 according to the first exemplary embodiment, and is a combination of the second exemplary embodiment and the third exemplary embodiment. Consequently, the content stated on the form is checked, and the modified content of the form is described on the differential form (document 107B).

Figure 13:
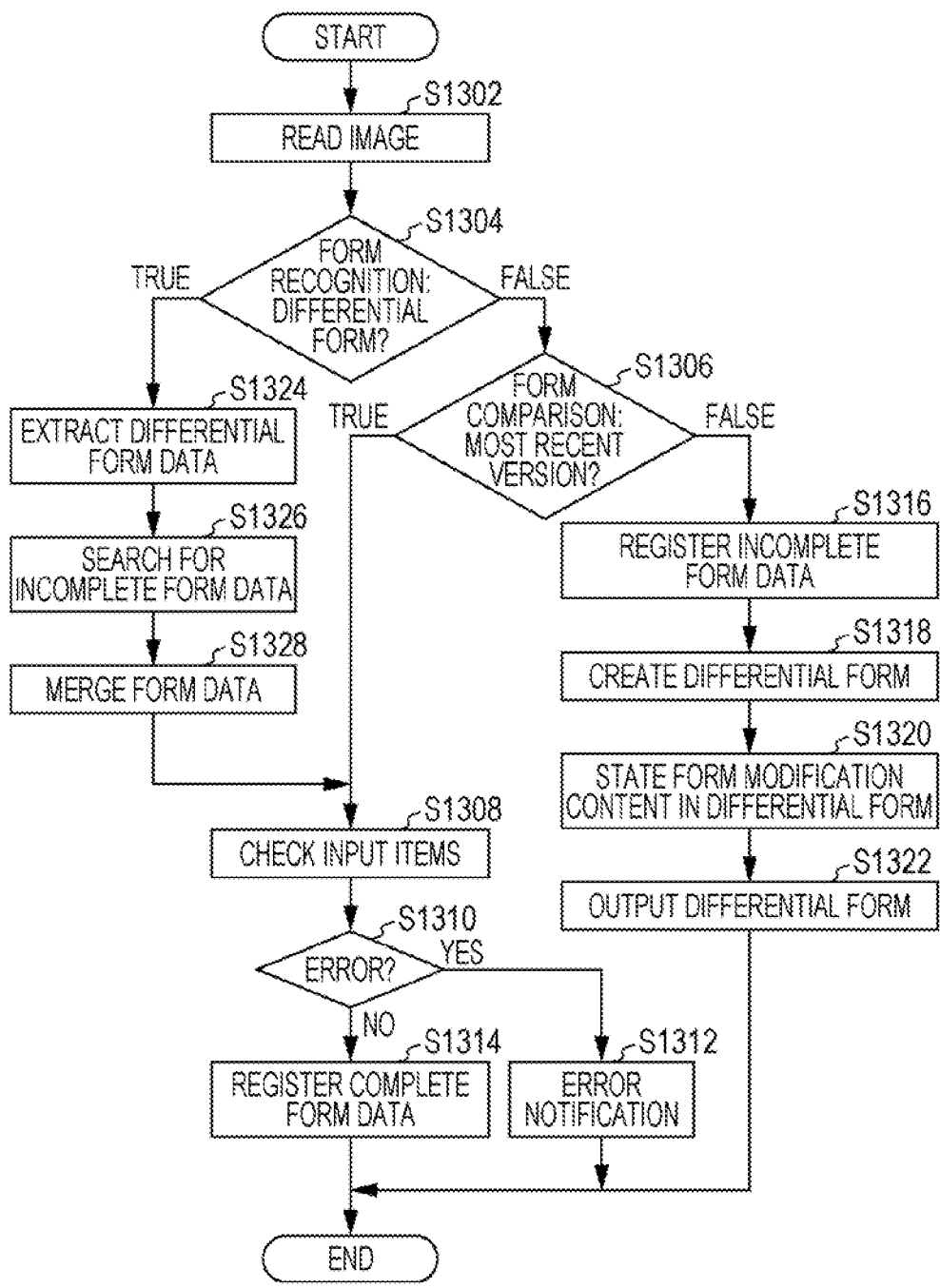
FIG. 13 is a flowchart illustrating an example process according to a fourth exemplary embodiment.

FIG. 13 is a flowchart illustrating an exemplary process according to the fourth exemplary embodiment. FIG. 13 is a combination of the flowchart illustrating an example process according to the second exemplary embodiment illustrated as an example in FIG. 8 and the flowchart illustrating an example process according to the third exemplary embodiment illustrated as an example in FIG. 10.

In step S1302, the image reading/output module 110 reads an image.

In step S1304, the form recognition module 125 recognizes the form, and determines whether or not the form is a differential form. If the form is a differential form, the process proceeds to step S1324. Otherwise, the process proceeds to step S1306.

In step S1306, the form comparison module 130 conducts form comparison, and determines whether or not the form is the most recent version. If the form is the most recent version, the process proceeds to step S1308. Otherwise, the process proceeds to step S1316.

In step S1308, the input item check module 770 checks the input items.

In step S1310, it is determined whether or not an error exists, and if so, the process proceeds to step S1312, otherwise the process proceeds to step S1314.

In step S1312, the input item check module 770 issues an error notification.

In step S1314, if the process advanced from step S1306, the form comparison module 130 registers complete form data in the complete form data storage module 135, whereas if the process advanced from step S1328, the difference merge module 155 registers complete form data in the complete form data storage module 135.

In step S1316, the form comparison module 130 registers incomplete form data.

In step S1318, the differential form creation module 140 creates a differential form.

In step S1320, the form modification content statement module 980 states form modification content on the differential form.

In step S1322, the image reading/output module 110 outputs the differential form.

In step S1324, the difference merge module 155 extracts differential form data.

In step S1326, the difference merge module 155 searches for incomplete form data.

In step S1328, the difference merge module 155 merges form data.

<<Fifth Exemplary Embodiment>>

FIG. 14 is a schematic module configuration diagram for an exemplary configuration according to the fifth exemplary embodiment.

The fifth exemplary embodiment conducts a process in a case in which an old version of form data and differential form data are read in successively. Compared to the foregoing exemplary embodiments, the incomplete form data storage module 145, the identifier attachment module 150, and the identifier reading module 160 may be omitted.

The information processing device 1400 includes an image reading/output module 1410, a form recognition module 1425, a form comparison module 1430, a complete form data storage module 1435, a differential form creation module 1440, and a combined difference merge module 1450.

The image reading/output module 1410 is connected to the form recognition module 1425 and the differential form creation module 1440. The image reading/output module 1410 reads a document 1407A and a document 1407C, and outputs a document 1407B. The image reading/output module 1410 conducts a process similar to the image reading/output module 110 according to the first exemplary embodiment. However, the image reading/output module 1410 does not read in the document 107C individually, but instead reads in the document 1407A and the document 14070 successively.

The form recognition module 1425 is connected to the image reading/output module 1410, the form comparison module 1430, and the combined difference merge module 1450. The form recognition module 1425 passes not-included differential form data 1427 to the form comparison module 1430, and passes included differential form data 1429 to the combined difference merge module 1450. The form recognition module 1425 conducts a process similar to the form recognition module 125.

The form comparison module 1430 is connected to the form recognition module 1425, the complete form data storage module 1435, and the differential form creation module 1440. The form comparison module 1430 receives not-included differential form data 1427 from the form recognition module 1425, passes a most recent version 1432 to the complete form data storage module 1435, and passes a not-most recent version 1434 to the differential form creation module 1440. The form comparison module 1430 conducts a process similar to the form comparison module 130.

The complete form data storage module 1435 is connected to the form comparison module 1430 and the combined difference merge module 1450, and receives the most recent version 1432 from the form comparison module 1430. The complete form data storage module 1435 conducts a process similar to the complete form data storage module 135.

The differential form creation module 1440 is connected to the image reading/output module 1410, and the form comparison module 1430, and receives the not-most recent version 1434 from the form comparison module 1430. The differential form creation module 1440 conducts a process similar to the differential form creation module 140.

The combined difference merge module 1450 is connected to the form recognition module 1425 and the complete form data storage module 1435. The combined difference merge module 1450 receives included differential form data 1429 from the form recognition module 1425. When a document filled in by the user (document 1407A) and a differential document (document 1407C) are read in, the combined difference merge module 1450 merges the filled-in content of the document with the content stated on the differential document, and subsequently causes the complete form data storage module 1435 to store the merged content. In other words, documents read in successively are treated as a document stated using an old version of the form and a document stated using a differential form, and the content stated in these documents is merged and treated as the content stated on the most recent version of the form. Since it is sufficient to merge the content of documents read in successively, the identifier discussed earlier may be omitted, and in addition, the storage of the content of the document 1407A that was read in first may also be omitted.

Figure 15:
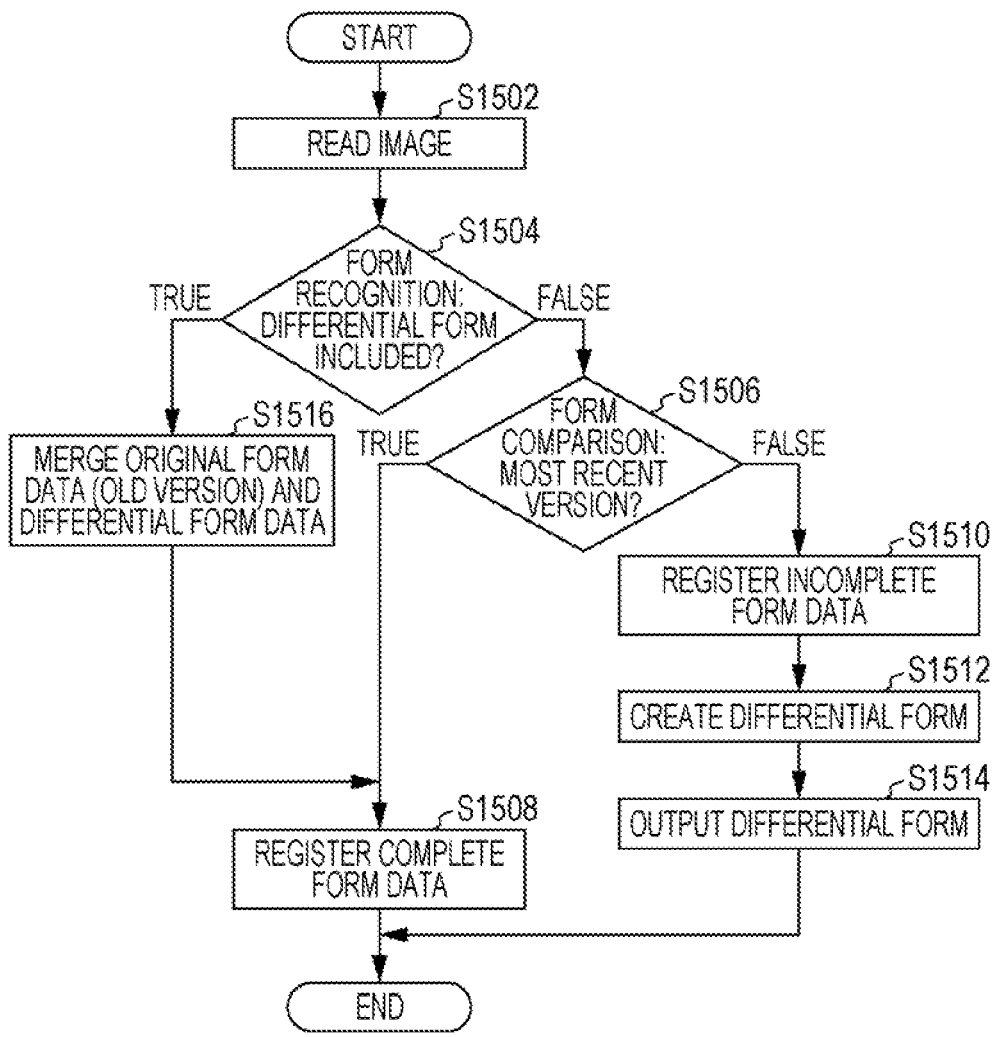
FIG. 15 is a flowchart illustrating an example process according to a fifth exemplary embodiment.

FIG. 15 is a flowchart illustrating an exemplary process according to the fifth exemplary embodiment.

In step S1502, the image reading/output module 1410 reads an image.

In step S1504, the form recognition module 1425 recognizes the form, and determines whether or not a differential form is included. If a differential form is included, the process proceeds to step S1516. Otherwise, the process proceeds to step S1506.

In step S1506, the form comparison module 1430 conducts form comparison, and determines whether or not the form is the most recent version. If the form is the most recent version, the process proceeds to step S1508. Otherwise, the process proceeds to step S1510.

In step S1508, if the process advanced from step S1506, the form comparison module 1430 registers complete form data in the complete form data storage module 1435, whereas if the process advanced from step S1516, the combined difference merge module 1450 registers complete form data in the complete form data storage module 1435.

In step S1510, the form comparison module 1430 registers incomplete form data.

In step S1512, the differential form creation module 1440 creates a differential form.

In step S1514, the image reading/output module 1410 outputs the differential form.

In step S1516, the combined difference merge module 1450 merges the original form data (old version) with the differential form data.

An exemplary hardware configuration of an image processing device according to an exemplary embodiment will now be described with reference to FIG. 16. The configuration illustrated in FIG. 16 may be realized by a personal computer (PC), for example, and illustrates an exemplary hardware configuration equipped with a data reading unit 1617 such as a scanner, and a data output unit 1618 such as a printer.

The central processing unit (CPU) 1601 is a controller that executes processing according to a computer program that states execution sequences for the various modules described in the foregoing exemplary embodiments, or in other words, for respective modules such as image reading/output module 110, the form recognition module 125, the form comparison module 130, the differential form creation module 140, the identifier attachment module 150, the difference merge module 155, the identifier reading module 160, the input item check module 770, the form modification content statement module 980, the image reading/output module 1410, the form recognition module 1425, the form comparison module 1430, the differential form creation module 1440, and the combined difference merge module 1450.

The read-only memory (ROM) 1602 stores information such as programs and computational parameters used by the CPU 1601. The random access memory (RAM) 1603 stores information such as programs used during execution by the CPU 1601, and parameters that change as appropriate during such execution. These memory units are connected to each other by a host bus 1604 realized by a CPU bus, for example.

The host bus 1604 is connected to an external bus 1606 such as a Peripheral Component Interconnect/Interface (PCI) bus via the bridge 1605.

The keyboard 1608 and the mouse or other pointing device 1609 are input devices operated by a user. The display 1610 may be a liquid crystal display (LCD) or cathode ray tube (CRT) device, and displays various information as text and image information.

The hard disk drive (HDD) 1611 houses and drives a hard disk (which may also be flash memory or the like), causing programs executed by the CPU 1601 and information to be recorded thereto or retrieved therefrom. On the hard disk, information such as a read-in document image and differential form image is stored, thereby realizing the functions of modules such as the complete form data storage module 135, the incomplete form data storage module 145, and the complete form data storage module 1435. Additionally, information such as various other data and various computer programs are stored therein.

The drive 1612 reads out data or programs recorded onto a removable recording medium 1613 such as an inserted magnetic disk, optical disc, magneto-optical disc, or semiconductor memory, and supplies the data or programs to the RAM 1603 connected via the interface 1607, the external bus 1606, the bridge 1605, and the host bus 1604. The removable recording medium 1613 is usable as a data recording area similar to a hard disk.

The connection port 1614 is a port that connects to an externally connected device 1615, and has a USB, IEEE 1394, or similar receptacle. The connection port 1614 is connected to the CPU 1601 via the interface 1607, the external bus 1606, the bridge 1605, and the host bus 1604. The communication unit 1616 is connected to a communication link and executes data communication processing with external equipment. The data reading unit 1617 may be a scanner, for example, and executes document scanning processing. The data output unit 1618 may be a printer, for example, and executes document data output processing. The data reading unit 1617 and the data output unit 1618 realize the functions of the image reading/output module 110 and the image reading/output module 1410.

Figure 16:
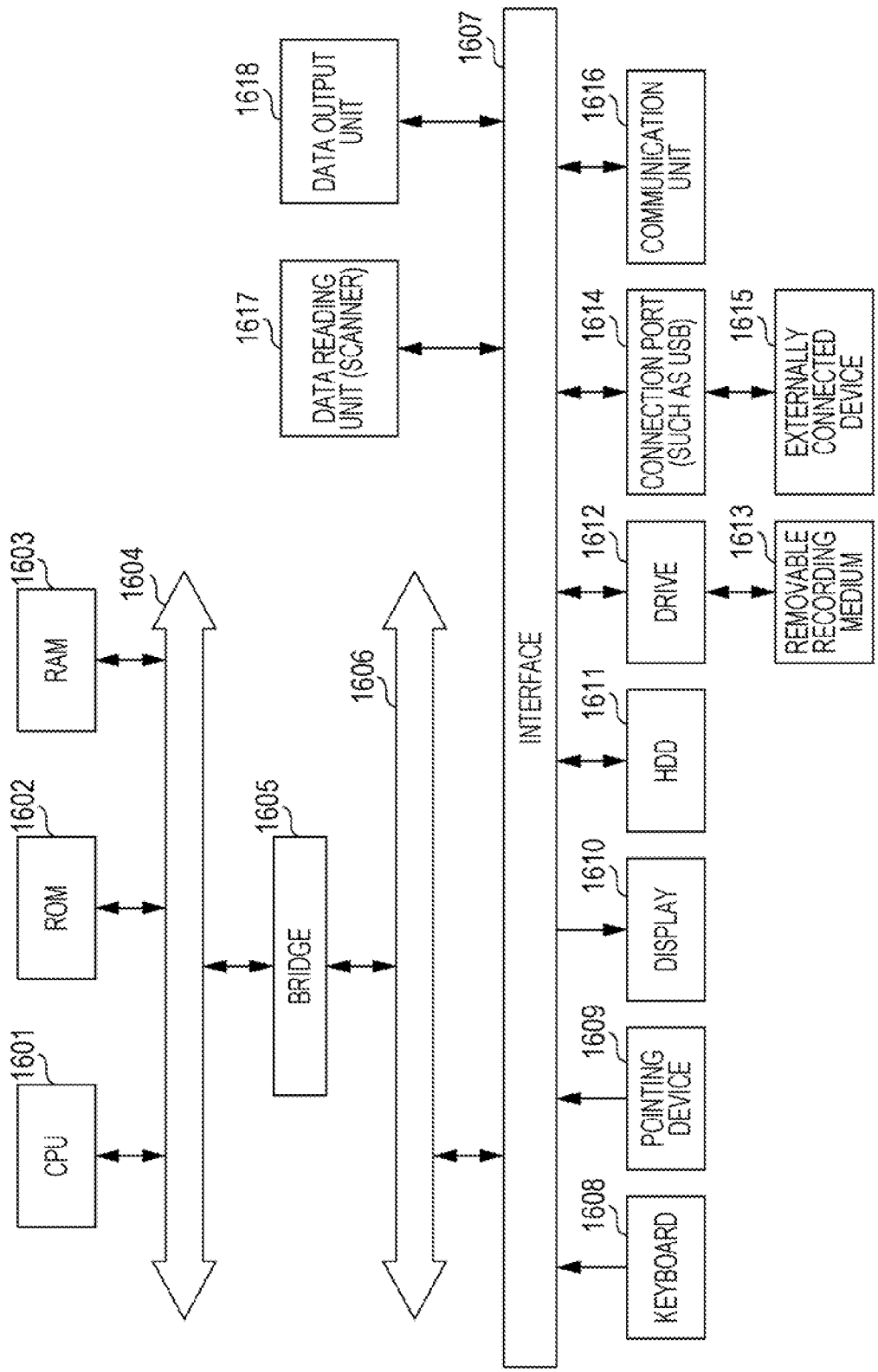
FIG. 16 is a block diagram illustrating an exemplary hardware configuration of a computer that realizes an exemplary embodiment.

Note that the hardware configuration of an image processing device illustrated in FIG. 16 illustrates a single exemplary configuration, and that an exemplary embodiment is not limited to the configuration illustrated in FIG. 16 insofar as the configuration still enables execution of the modules described in an exemplary embodiment. For example, some modules may also be realized with special-purpose hardware (such as an application-specific integrated circuit (ASIC), for example), and some modules may be configured to reside within an external system and be connected via a communication link. Furthermore, it may also be configured such that multiple instances of the system illustrated in FIG. 16 are connected to each other by a communication link and operate in conjunction with each other. Additionally, besides a personal computer in particular, an exemplary embodiment may also be incorporated into a device such as a mobile information/communication device (including devices such as a mobile phone, a smartphone, mobile equipment, and a wearable computer), information appliance, robot, photocopier, fax machine, scanner, printer, or multi-function device.

Note that the various exemplary embodiments discussed earlier may also be combined (including, for example, adding or substituting a module from one exemplary embodiment into another exemplary embodiment), and in addition, technology of the related art may also be adopted as part of the processing content of each module.

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

The recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), an internet, an intranet, an extranet, or some combination thereof, or alternatively, by being modulated onto a carrier wave and propagated.

Furthermore, the above program may be part of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
one or more processors programmed to
read in a filled-in document,
recognize a standard document type and an information structure of the read-in document,
store content filled in on the read-in document in a memory;
if the read-in document is not a most recent version, compare an information structure of the most recent version of a preregistered standard document type corresponding to the recognized standard document type to the recognized information structure,
generate a differential document which includes only information structure of the most recent version that is not present or is presented differently in the recognized information structure, according to a result of the comparison, and
output the generated differential document.

2. The information processing device according to claim 1, wherein
if the differential document filled in by a user is read in, the one or more processors merge filled-in content on the differential document with the filled-in content on the read-in document stored in the memory, and
the one or more processors replace already-stored content with the content merged for storage.

3. The information processing device according to claim 2, wherein
if a document filled in by a user and a differential document filled in by the user are read in, the one or more processors merge the filled-in content on the document filled in by the user with the filled-in content on the differential document filled in by the user.

4. The information processing device according to claim 2, wherein
the one or more processors inspect content to be stored, and if the content to be stored is unsuitable, output an indication that the content to be stored is unsuitable.

5. The information processing device according to claim 4, wherein
the one or more processors add and output an explanatory note to the differential document based on the result of the comparison.

6. The information processing device according to claim 5, wherein
if a document filled in by a user and a differential document filled in by the user are read in, the one or more processors merge the filled-in content on the document filled in by the user with the filled-in content on the differential document filled in by the user.

7. The information processing device according to claim 4, wherein
if a document filled in by a user and a differential document filled in by the user are read in, the one or more processors merge the filled-in content on the document filled in by the user with the filled-in content on the differential document filled in by the user.

8. The information processing device according to claim 2, wherein
the one or more processors add and output an explanatory note to the differential document based on the result of the comparison.

9. The information processing device according to claim 8, wherein
if a document filled in by a user and a differential document filled in by the user are read in, the one or more processors merge the filled-in content on the document filled in by the user with the filled-in content on the differential document filled in by the user.

10. The information processing device according to claim 1, wherein
the differential document is generated so as to include information structure absent from the filled-in document but present on the most recent version, or information structure present on the filled-in document but presented differently on the most recent version.

11. The information processing device according to claim 1, wherein
the differential document is generated so as not to include information structure present on the filled-in document but absent from the most recent version.

12. An information processing method comprising:
reading in a filled-in document;
recognizing a standard document type and an information structure of the read-in document;
storing content filled in on the read-in document;
comparing, if the read-in document is not a most recent version, an information structure of the most recent version of a preregistered standard document type corresponding to the recognized standard document type to the recognized information structure;
generating a differential document which includes only information structure of the most recent version that is not present or is presented differently in the recognized information structure, according to a result of the comparing; and
outputting the generated differential document.

13. A non-transitory computer-readable medium storing a program causing a computer to execute a process for processing information, the process comprising:
reading in a filled-in document;
recognizing a standard document type and an information structure of the read-in document;
storing content filled in on the read-in document;
comparing, if the read-in document is not a most recent version, an information structure of the most recent version of a preregistered standard document type corresponding to the recognized standard document type to the recognized information structure;
generating a differential document which includes only information structure of the most recent version that is not present or is presented differently in the recognized information structure, according to a result of the comparing; and
outputting the generated differential document.

* * * * *